United States Patent
Esseghir et al.

(10) Patent No.: US 10,648,750 B2
(45) Date of Patent: May 12, 2020

(54) OLEFIN BLOCK COMPOSITE THERMALLY CONDUCTIVE MATERIALS

(71) Applicant: Dow Global Technologies LLC, Midland, MI (US)

(72) Inventors: Mohamed Esseghir, Collegeville, PA (US); Bharat I. Chaudhary, Princeton, NJ (US); Jeffrey M. Cogen, Flemington, NJ (US); Gary R. Marchand, Maurepas, LA (US)

(73) Assignee: Dow Global Technologies LLC, Midland, MI (US)

( * ) Notice: Subject to any disclaimer, the term of this patent is extended or adjusted under 35 U.S.C. 154(b) by 206 days.

(21) Appl. No.: 15/514,862

(22) PCT Filed: Oct. 14, 2015

(86) PCT No.: PCT/US2015/055477
§ 371 (c)(1),
(2) Date: Mar. 28, 2017

(87) PCT Pub. No.: WO2016/069265
PCT Pub. Date: May 6, 2016

(65) Prior Publication Data
US 2017/0227304 A1    Aug. 10, 2017

Related U.S. Application Data

(60) Provisional application No. 62/069,873, filed on Oct. 29, 2014.

(51) Int. Cl.
| | | |
|---|---|---|
| *F28F 13/18* | (2006.01) | |
| *B29C 33/38* | (2006.01) | |
| *B29C 45/00* | (2006.01) | |
| *C08K 3/04* | (2006.01) | |
| *C08K 3/08* | (2006.01) | |
| *C08L 23/14* | (2006.01) | |
| *C08L 53/00* | (2006.01) | |
| *F28F 21/02* | (2006.01) | |
| *C08L 23/08* | (2006.01) | |

(52) U.S. Cl.
CPC ............. *F28F 13/18* (2013.01); *B29C 33/38* (2013.01); *B29C 45/0001* (2013.01); *C08K 3/04* (2013.01); *C08K 3/08* (2013.01); *C08L 23/08* (2013.01); *C08L 23/14* (2013.01); *C08L 53/00* (2013.01); *F28F 21/02* (2013.01); *C08K 3/041* (2017.05); *C08K 2003/0812* (2013.01); *C08K 2003/0893* (2013.01); *C08L 2205/03* (2013.01); *F28F 2255/06* (2013.01)

(58) Field of Classification Search
CPC ........ F28F 13/18; F28F 21/02; F28F 2255/06; B29C 33/38; B29C 45/0001; C08K 3/04; C08K 3/08; C08K 3/041; C08K 2003/0812; C08K 2003/0893; C08L 23/08; C08L 23/14; C08L 53/00; C08L 2205/03
USPC ....................................................... 524/412
See application file for complete search history.

(56) References Cited

U.S. PATENT DOCUMENTS

| | | | |
|---|---|---|---|
| 6,391,442 B1 | 5/2002 | Duvall et al. | |
| 7,662,307 B2 | 2/2010 | Chiou et al. | |
| 8,283,399 B2 * | 10/2012 | Heck | C08L 23/0815 524/447 |
| 2008/0277619 A1 | 11/2008 | Matsumoto et al. | |
| 2011/0082257 A1 * | 4/2011 | Carnahan | C08F 297/083 525/88 |
| 2011/0129677 A1 | 6/2011 | Fukuoka et al. | |
| 2011/0260096 A1 | 10/2011 | Atarashi | |
| 2012/0208946 A1 * | 8/2012 | Shan | C08L 23/10 524/505 |
| 2012/0238687 A1 | 9/2012 | Atarashi | |

FOREIGN PATENT DOCUMENTS

| | | |
|---|---|---|
| CN | 101717579 A | 6/2010 |
| CN | 102311567 A | 1/2012 |
| JP | 2004071385 A | 3/2004 |
| JP | 2010132838 A | 6/2010 |
| WO | 2009129068 A2 | 10/2009 |
| WO | 2011159446 A1 | 12/2011 |
| WO | 2011159447 A1 | 12/2011 |

OTHER PUBLICATIONS

"Enhanced thermal conductivity over percolation threshold in polyimide blend films containing ZnO nano-pyramidal particles: advantage of vertical double percolation structure;" Journal of Materials Chemistry, 2011, 21, 4402.
"Thermal Conductivity of Copoly(ethylene vinyl acetate)/Nanofiller Blends;" Composites Science and Technology 68 (2008) 1843-1853.
PCT/US2015/055477, International Preliminary Report on Patentability dated May 2, 2017.
International Search Report and Written Opinion for PCT/US2015/055477 dated Feb. 11, 2016, 8 pages.

* cited by examiner

*Primary Examiner* — Josephine L Chang
(74) *Attorney, Agent, or Firm* — Quarles & Brady LLP

(57) ABSTRACT

Thermally conductive materials comprising an olefin block composite and a thermally conductive filler, where the thermally conductive filler is present in an amount sufficient to increase the thermal conductivity of the olefin block composite relative to the olefin block composite in its neat state. Such thermally conductive materials can be used in various articles of manufacture, such as a thermal interface material or a molded heat dissipation component.

12 Claims, No Drawings

OLEFIN BLOCK COMPOSITE THERMALLY CONDUCTIVE MATERIALS

REFERENCE TO RELATED APPLICATIONS

The present application claims the benefit of U.S. Provisional Application No. 62/069,873, filed on Oct. 29, 2014.

FIELD

Various embodiments of the present invention relate to thermally conductive materials comprising an olefin block composite and a thermally conductive filler.

INTRODUCTION

Thermally conductive polymers are desired in many heat-management applications to remove or dissipate heat from an undesirable location in order to maintain proper operating temperature of associated equipment or apparatus. Heat management is widely used in electronic, telecommunication, and computer applications, where the heat generated by electronic devices must be adequately dissipated so the electronics do not exceed a certain design temperature to operate properly. With increased computing and data transmission power, heat management is an ever-growing challenge. More specifically, there is an increased need for dissipating heat from microelectronics devices for telecommunication and data infrastructure such as, for example, remote radio head units and data servers. Two areas of industrial interest are thermal interface materials ("TIM") and injection-moldable thermally conductive materials for low-cost manufacture of lightweight heat-dissipation components. Although advances have been made in these areas, improvements are still desired.

SUMMARY

One embodiment is a thermally conductive material, comprising:
(a) an olefin block composite; and
(b) a thermally conductive filler,
wherein said thermally conductive filler is present in an amount sufficient to provide said thermally conductive material with a higher thermal conductivity relative to said olefin block composite in its neat state.

DETAILED DESCRIPTION

Various embodiments of the present invention concern thermally conductive materials comprising an olefin block composite and a thermally conductive filler. Such thermally conductive materials can be used in various articles of manufacture, such as a thermal interface material or a molded heat-dissipation component.

Olefin Block Composite

The thermally conductive materials described herein comprise an olefin block composite. The term "block composite" refers to polymer compositions comprising three components: (1) a soft copolymer, (2) a hard polymer, and (3) a block copolymer having a soft segment and a hard segment. The hard segment of the block copolymer is the same composition as the hard polymer in the block composite and the soft segment of the block copolymer is the same composition as the soft copolymer of the block composite.

The block copolymers present in the olefin block composite can be linear or branched. More specifically, when produced in a continuous process, the block composites can have a PDI from 1.7 to 15, from 1.8 to 3.5, from 1.8 to 2.2, or from 1.8 to 2.1. When produced in a batch or semi-batch process, the block composites can have a PDI from 1.0 to 2.9, from 1.3 to 2.5, from 1.4 to 2.0, or from 1.4 to 1.8. The term "olefin block composite" refers to block composites prepared solely or substantially solely from two or more α-olefin types of monomers. In various embodiments, the olefin block composite can consist of only two α-olefin type monomer units. An example of an olefin block composite would be a hard segment and hard polymer comprising only or substantially only propylene monomer residues with a soft segment and soft polymer comprising only or substantially only ethylene and propylene comonomer residues.

In describing olefin block composites, "hard" segments refer to highly crystalline blocks of polymerized units in which a single monomer is present in an amount greater than 95 mol %, or greater than 98 mol %. In other words, the comonomer content in the hard segments is less than 5 mol %, or less than 2 mol %. In some embodiments, the hard segments comprise all or substantially all propylene units. "Soft" segments, on the other hand, refer to amorphous, substantially amorphous or elastomeric blocks of polymerized units having a comonomer content greater than 10 mol %. In some embodiments, the soft segments comprise ethylene/propylene interpolymers.

When referring to block composites, the term "polyethylene" includes homopolymers of ethylene and copolymers of ethylene and one or more $C_{3-8}$ α-olefins in which ethylene comprises at least 50 mole percent. The term "propylene copolymer" or "propylene interpolymer" means a copolymer comprising propylene and one or more copolymerizable comonomers, where a plurality of the polymerized monomer units of at least one block or segment in the polymer (the crystalline block) comprises propylene, which can be present in an amount of at least 90 mole percent, at least 95 mole percent, or at least 98 mole percent. A polymer made primarily from a different α-olefin, such as 4-methyl-1-pentene would be named similarly. The term "crystalline," when used to describe olefin block composites, refers to a polymer or polymer block that possesses a first order transition or crystalline melting point ("Tm") as determined by differential scanning calorimetry ("DSC") or equivalent technique. The term "crystalline" may be used interchangeably with the term "semicrystalline." The term "amorphous" refers to a polymer lacking a crystalline melting point. The term, "isotactic" denotes polymer repeat units having at least 70 percent isotactic pentads as determined by $^{13}C$-nuclear magnetic resonance ("NMR") analysis. "Highly isotactic" denotes polymers having at least 90 percent isotactic pentads.

When referring to olefin block composites, the term "block copolymer" or "segmented copolymer" refers to a polymer comprising two or more chemically distinct regions or segments (referred to as "blocks") joined in a linear manner, that is, a polymer comprising chemically differentiated units which are joined end-to-end with respect to polymerized ethylenic functionality, rather than in pendent or grafted fashion. In an embodiment, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The olefin block composites employed herein are characterized by unique distributions of polymer PDI, block length distribution, and/or block number distribution, due, in a preferred embodiment, to the effect of shuttling agent(s) in combination with the catalyst(s) used in preparing the block composites.

The olefin block composite employed herein can be prepared by a process comprising contacting an addition polymerizable monomer or mixture of monomers under addition polymerization conditions with a composition comprising at least one addition polymerization catalyst, a cocatalyst and a chain shuttling agent ("CSA"), the process being characterized by formation of at least some of the growing polymer chains under differentiated process conditions in two or more reactors operating under steady state polymerization conditions or in two or more zones of a reactor operating under plug flow polymerization conditions.

Suitable monomers for use in preparing the olefin block composites of the present invention include any addition polymerizable monomer, such as any olefin or diolefin monomer, including any α-olefin. Examples of suitable monomers include straight-chain or branched α-olefins of 2 to 30, or 2 to 20, carbon atoms, such as ethylene, propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene and 1-eicosene; and di- and poly-olefins, such as butadiene, isoprene, 4-methyl-1,3-pentadiene, 1,3-pentadiene, 1,4-pentadiene, 1,5-hexadiene, 1,4-hexadiene, 1,3-hexadiene, 1,3-octadiene, 1,4-octadiene, 1,5-octadiene, 1,6-octadiene, 1,7-octadiene, ethylidene norbornene, vinyl norbornene, dicyclopentadiene, 7-methyl-1,6-octadiene, 4-ethylidene-8-methyl-1,7-nonadiene, and 5,9-dimethyl-1,4,8-decatriene. In various embodiments, ethylene and at least one copolymerizable comonomer, propylene and at least one copolymerizable comonomer having from 4 to 20 carbons, 1-butene and at least one copolymerizable comonomer having 2 or from 5 to 20 carbons, or 4-methyl-1-pentene and at least one different copolymerizable comonomer having from 4 to 20 carbons can be employed. In an embodiment, the olefin block composites are prepared using propylene and ethylene monomers.

Comonomer content in the resulting block composites may be measured using any suitable technique, such as NMR spectroscopy. It is highly desirable that some or all of the polymer blocks comprise amorphous or relatively amorphous polymers such as copolymers of propylene, 1-butene, or 4-methyl-1-pentene and a comonomer, especially random copolymers of propylene, 1-butene, or 4-methyl-1-pentene with ethylene, and any remaining polymer blocks (hard segments), if any, predominantly comprise propylene, 1-butene or 4-methyl-1-pentene in polymerized form. Preferably such hard segments are highly crystalline or stereospecific polypropylene, polybutene or poly-4-methyl-1-pentene, especially isotactic homopolymers.

Further, the block copolymers of the block composites comprise from 10 to 90 weight percent ("wt %") hard segments and 90 to 10 wt % soft segments.

Within the soft segments, the mole percent comonomer may range from 5 to 90 wt %, or from 10 to 60 wt %. In the case where the comonomer is ethylene, it can be present in an amount from 10 to 75 wt %, or from 30 to 70 wt %. In an embodiment, propylene constitutes the remainder of the soft segment.

In an embodiment, the block copolymers of the olefin block composites comprise hard segments that are 80 to 100 wt % propylene. The hard segments can be greater than 90 wt %, 95 wt %, or 98 wt % propylene.

The block composites described herein may be differentiated from conventional, random copolymers, physical blends of polymers, and block copolymers prepared via sequential monomer addition. The block composites may be differentiated from random copolymers by characteristics such as higher melting temperatures for a comparable amount of comonomer, block composite index, as described below; from a physical blend by characteristics such as block composite index, better tensile strength, improved fracture strength, finer morphology, improved optics, and greater impact strength at lower temperature; from block copolymers prepared by sequential monomer addition by molecular weight distribution, rheology, shear thinning, rheology ratio, and in that there is block polydispersity.

In some embodiments, the block composites have a Block Composite Index ("BCI"), as defined below, that is greater than zero but less than 0.4, or from 0.1 to 0.3. In other embodiments, BCI is greater than 0.4 and up to about 1.0. Additionally, the BCI can range from 0.4 to 0.7, from 0.5 to 0.7, or from 0.6 to 0.9. In some embodiments, BCI ranges from 0.3 to 0.9, from 0.3 to 0.8, from 0.3 to 0.7, from 0.3 to 0.6, from 0.3 to 0.5, or from 0.3 to 0.4. In other embodiments, BCI ranges from 0.4 to less than 1.0, from 0.5 to less than 1.0, from 0.6 to less than 1.0, from 0.7 to less than 1.0, from 0.8 to less than 1.0, or from 0.9 to less than 1.0. BCI is herein defined to equal the weight percentage of block copolymer divided by 100% (i.e., weight fraction). The value of the block composite index can range from 0 to 1, wherein 1 would be equal to 100% block copolymer and zero would be for a material such as a traditional blend or random copolymer. BCI is determined according to the method described in U.S. Published Patent Application No. 2011/0082258 from paragraph [0170] to [0189].

The olefin block composites can have a Tm greater than 100° C., preferably greater than 120° C., and more preferably greater than 125° C. The melt index ("$I_2$") of the block composite can range from 0.1 to 1000 g/10 min., from 0.1 to 50 g/10 min., from 0.1 to 30 g/10 min., or from 1 to 20 g/10 min. Melt index is determined according to ASTM International ("ASTM") method D1238. Unless otherwise noted, melt index is determined using conditions 190° C. and 2.16 kg. The block composites can have a weight average molecular weight ("Mw") from 10,000 to 2,500,000, from 35,000 to 1,000,000, from 50,000 to 300,000, or from 50,000 to 200,000 g/mol. The olefin block composite can have a density of at least 0.877 g/cm$^3$, at least 0.880 g/cm$^3$, or at least 0.882 g/cm$^3$. The olefin block composite can have a density of less than 0.94 g/cm$^3$, or less than 0.93 g/cm$^3$. Density is determined according to ASTM D792.

Processes useful in producing the olefin block composites suitable for use in the present invention may be found, for example, in U.S. Patent Application Publication No. 2008/0269412, published on Oct. 30, 2008. Suitable catalysts and catalyst precursors for use in the present invention include metal complexes such as disclosed in WO 2005/090426, in particular, those disclosed starting on page 20, line 30 through page 53, line 20. Suitable catalysts are also disclosed in U.S. 2006/0199930; U.S. 2007/0167578; U.S. 2008/0311812; U.S. 2011/0082258; U.S. Pat. No. 7,355,089; and WO 2009/012215. Suitable co-catalysts are those disclosed in WO 2005/090426, in particular, those disclosed on page 54, line 1 to page 60, line 12. Suitable chain shuttling agents are those disclosed in WO 2005/090426, in particular, those disclosed on page 19, line 21 through page 20 line 12. Particularly preferred chain shuttling agents are dialkyl zinc compounds. The olefin block composites themselves are more fully described in U.S. Pat. No. 8,476,366.

In one or more embodiments, the olefin block composite can be present in the thermally conductive material in an amount ranging from 10 to 90 wt %, or from 60 to 90 wt %, based on the combined weight of the olefin block composite and the thermally conductive filler.

Thermally Conductive Filler

Any thermally conductive filler that will increase the thermal conductivity of above-described olefin block composite, relative to the neat olefin block composite, may be employed. In various embodiments, the thermally conductive filler can be present in an amount sufficient to increase the thermal conductivity of the neat olefin block copolymer by at least 10%, at least 50%, at least 100%, at least 200%, at least 500%, or at least 1,000%. Additionally, the thermally conductive filler can be present in an amount sufficient to provide the thermally conductive material with a thermal conductivity of at least 0.1 watts per meter Kelvin ("W/m·K"), at least 0.5 W/m·K, at least 1 W/m·K, at least 2 W/m·K, or at least 4 W/m·K. In various embodiments, the thermally conductive material can have a thermal conductivity of less than 10 W/m·K, less than 8 W/m·K, or less than 6 W/m·K. Thermal conductivity is determined according to the procedure described in the Test Methods section, below, and are reported at 25° C.

Representative conductive fillers include, but are not limited to, conductive carbon blacks, conductive carbons, and metal particles. Mixtures of two or more of these conductive fillers can be employed in any relative proportion. The fillers may carry or contain various surface coatings or treatments, such as silanes, fatty acids, and the like.

Conductive carbon blacks can be selected from any of the carbon blacks listed in ASTM D-1765-76, which includes carbon blacks so listed in accordance with their ASTM designations: N50, N60, N110, N121, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. Carbon black also includes furnace black, acetylene black, thermal black, lamb black, and Ketjen black. These carbon blacks have iodine absorptions ranging from 10 to 200 g/kg and DBP number ranging from 30 to 400 cc/100 g, nitrogen surface areas ranging from 10 to 1,000 cm$^3$/100 g. The surface area is determined under ASTM D 4820-93a (Multipoint B.E.T. Nitrogen Adsorption). Generally, smaller particle sized carbon blacks are employed to the extent cost considerations permit. In one embodiment the carbon black is conductive furnace black.

Conductive carbons, as distinguished from conductive carbon blacks, include carbon fiber, carbon nanotubes, fullerene, graphene, graphites and expanded graphite platelets. The average particle size of such materials is typically of nano-scale proportions.

Conductive metal particles include granules, powder, fibers, platelets, and the like, and oxides thereof. These metal particles typically have an average particle size of 0.1 to 100 µm, more typically 0.3 to 30 µm, as measured by X-ray line broadening. The metal particles may have any particle shape desired although, as is known, the shape selection may depend upon the intended end use of the metal-filled product. Spherical shapes, platelets, prismatic shapes, whiskers, and the like, can be used.

Metals that can be used as a conductive filler include, alone or in admixture with one or more other such metals, or as finely powdered alloys, aluminum, indium, tin, lead, bismuth, as well as Groups II-B through VII-B elements of the Periodic Table including such elements as zinc, cadmium, scandium, titanium, zirconium, vanadium, chromium, molybdenum, tungsten, manganese, rhenium, iron, ruthenium, osmium, cobalt, rhodium, iridium, nickel, palladium, platinum, and the like. Particularly satisfactory for convenience and relative cheapness are aluminum, zinc, iron, nickel, tin, lead, and silver. Copper, while conductive, may in its metallic form be objectionable in some rubber compounding formulations.

In various embodiments, irrespective of the specific type of conductive filler, the conductive filler can have an average particle size in the nano-scale range. In other words, in various embodiments, the conductive filler can have an average particle size of at least 1 nanometer but less than 1,000 nanometers, less than 500 nanometers, less than 200 nanometers, less than 100 nanometers, or less than 50 nanometers.

Specific examples of thermally conductive fillers suitable for use herein include, but are not limited to, aluminum oxide ($Al_2O_3$), magnesium oxide (MgO), boron nitride (BN), zinc oxide (ZnO), silicon carbide (SiC), aluminum nitride (AlN), graphite, expanded graphite, multi-walled carbon nanotubes, carbon fiber, pyrolytic graphite sheets, silver, aluminum, copper, and mixtures of two or more thereof. In various embodiments, the thermally conductive filler is selected from the group consisting of expanded graphite, boron nitride, and mixtures thereof.

In one or more embodiments, the thermally conductive filler can be present in the thermally conductive material in an amount ranging from 10 to 90 wt %, or from 10 to 40 wt %, based on the combined weight of the olefin block composite and the thermally conductive filler. In other embodiments, the thermally conductive filler can be present in the thermally conductive material in an amount greater than 30 wt %, or greater than 40 wt %, based on the combined weight of the olefin block composite and the thermally conductive filler.

Optional Plasticizer

In various embodiments, the thermally conductive material may include an optional plasticizer. Plasticizers (which term includes not only conventional plasticizers, but also oil extenders, waxes, paraffins and solvents) useful herein include, but are not limited to, phthalic acid diesters (also known as "phthalates") such as di-isononyl phthalate (DINP), diallyl phthalate (DAP), di-2-ethylhexylphthalate (DEHP), dioctyl phthalate (DOP) and diisodecyl phthalate (DIDP); trimellitates such as trimethyl trimellitate, n-octyl trimellitate, and tri-(2-ethylhexyl) trimellitate; adipate-based plasticizers such as bis(2-ethylhexyl)adipate, dimethyl adipate and dioctyl adipate; sebacate-based plasticizers such as dibutyl sebacate; maleates such as dibutyl maleate; benzoates; sulfonamides such as N-ethyl toluene sulfonamide; organophosphates; polybutene; glycols/polyethers such as triethylene glycol dihexanoate; paraffinic process oils such as SUNPAR 2280 (Sunoco Corp.); specialty hydrocarbon fluids, and polymer modifiers; and those derived from renewable sources (i.e., biochemical plasticizers) such as epoxidized grain (e.g., soybean, corn, etc.) oil. Mixtures of plasticizers are often used to obtain optimum properties.

If present, the optional plasticizer can be present in an amount ranging from greater than 0 (e.g., 0.01) to 30 wt %, from 1 to 20 wt %, or from 5 to 15 wt %, based on the total weight of the thermally conductive material.

Optional Curing Agent

In one embodiment the thermally conductive materials can be crosslinked, either fully or partially. In those embodiments in which the composition is to be crosslinked, it typically contains at least one crosslinking agent, promoter, and/or scorch retardant to facilitate the crosslinking of the composition. These optional components include, but are not limited to, (1) a free radical initiator (e.g., an organic peroxide or an azo compound), (2) silane functionality (e.g., vinyl alkoxy silane or silane functional polyolefin with vinyl alkoxy silane) typically activated with moisture, (3) a sulfur-containing curative to facilitate vulcanization, and/or (4) a radiation-curing agent to promote crosslinking of the composition with electromagnetic radiation (e.g., infrared (IR), ultraviolet (UV), visible, gamma ray, etc.).

Representative scorch inhibitors include but are not limited to 2,2,6,6-tetramethylpiperidinoxyl (TEMPO) and 4-hydroxy-2,2,6,6-tetramethylpiperidinoxyl (4-hydroxy TEMPO). Representative promoters include but are not limited to triallyl isocyanurate; ethoxylated bisphenol A dimethacrylate; α-methyl styrene dimer; and other coagents such as those described in U.S. Pat. Nos. 5,346,961 and 4,018,852. These optional crosslinking agents, promoters and scorch inhibitors are used in known ways and in known amounts.

Suitable free radical initiators used as crosslinking agents are the dialkyl peroxides and diperoxyketal initiators. These compounds are described in the Encyclopedia of Chemical Technology, 3rd edition, Vol. 17, pp 27-90 (1982). Mixtures of two or more free radical initiators may also be used together as the free radical initiator. In addition, free radicals can form from shear energy, heat, or radiation.

In the group of dialkyl peroxides, nonlimiting examples of suitable free radical initiators are: dicumyl peroxide, di-t-butyl peroxide, t-butyl cumyl peroxide, 2,5-dimethyl-2,5-di(t-butylperoxy)-hexane, 2,5-dimethyl-2,5-di(t-amylperoxy)-hexane, 2,5-dimethyl-2,5-di(t-butylperoxy)hexyne-3, 2,5-dimethyl-2,5-di(t-amylperoxy)hexyne-3, α,α-di[(tbutylperoxy)-isopropyl]-benzene, di-t-amyl peroxide, 1,3,5-tri-[t-butylperoxy)-isopropyl]benzene, 1,3-dimethyl-3-(t-butylperoxy)butanol, 1,3-dimethyl-3-(t-amylperoxy) butanol, and mixtures of two or more of these initiators.

In the group of diperoxyketal initiators, nonlimiting examples of suitable free radical initiators include: 1,1-di(t-butylperoxy)-3,3,5-trimethylcyclohexane, 1,1-di(t-butylperoxy)cyclohexane n-butyl, 4,4-di(t-amylperoxy)valerate, ethyl 3,3-di(t-butylperoxy)butyrate, 2,2-di(t-amylperoxy) propane, 3,6,6,9,9-pentamethyl-3-ethoxycarbonylmethyl-1,2,4,5-tetraoxacyclononane, n-butyl-4,4-bis(t-butylperoxy)-valerate, ethyl-3,3-di(t-amylperoxy)-butyrate and mixtures of two or more of these initiators.

The amount of free radical initiator present in the composition can vary, with the minimum amount being sufficient to afford the desired range of crosslinking. In various embodiments, the minimum amount of free radical initiator can be at least 0.02 wt %, at least 0.05 wt %, or at least 0.1 wt % based on the weight of the crosslinkable polymer(s). Additionally, the maximum amount of free radical initiator in the composition can vary, and is typically determined by such factors as cost, efficiency, and degree of desired crosslinking. In various embodiments, the maximum amount can be less than 15 wt %, less than 10 wt %, or less than 5 wt % based on the weight of the crosslinkable polymer(s).

Additives

The thermally conductive materials described herein may also contain additives. Representative additives include, but are not limited to, antioxidants, cross linking co-agents, cure boosters, scorch retardants, processing aids, coupling agents, ultraviolet stabilizers (including UV absorbers), anti-static agents, nucleating agents, slip agents, lubricants, viscosity control agents, tackifiers, anti-blocking agents, surfactants, extender oils, acid scavengers, flame retardants, adhesion promoters, and metal deactivators. These additives are typically used in a conventional manner and in conventional amounts (e.g., from 0.01 wt % or less to 20 wt % or more based on the weight of the composition).

Suitable UV light stabilizers include hindered amine light stabilizers (HALS) and UV light absorber (UVA) additives. Representative UVA additives include benzotriazole types such as Tinuvin 326 and Tinuvin 328 commercially available from Ciba, Inc. Blends of HAL's and UVA additives are also effective. Examples of antioxidants include hindered phenols such as tetrakis [methylene(3,5-di-tert-butyl-4-hydroxyhydrocinnamate)] methane; bis [(beta-(3,5-ditert-butyl-4-hydroxybenzyl)methylcarboxyethyl)]-sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)-hydrocinnamate; phosphites and phosphonites such as tris(2,4-di-tert-butylphenyl) phosphite and di-tert-butylphenyl-phosphonite; thio compounds such as dilauryl-thiodipropionate, dimyristylthiodipropionate, and distearyl-thiodipropionate; various siloxanes; polymerized 2,2,4-trimethyl-1,2-dihydroquinoline, n,n'-bis(1,4-dimethylpentyl-p-phenylenediamine), alkylated diphenylamines, 4,4'-bis(alpha, alpha-dimethylbenzyl)diphenylamine, diphenyl-p-phenylenediamine, mixed di-aryl-p-phenylenediamines, and other hindered amine anti-degradants or stabilizers.

Examples of processing aids include but are not limited to metal salts of carboxylic acids such as zinc stearate or calcium stearate; fatty acids such as stearic acid, oleic acid, or erucic acid; fatty amides such as stearamide, oleamide, erucamide, or N,N'-ethylene bis-stearamide; polyethylene wax; oxidized polyethylene wax; polymers of ethylene oxide; copolymers of ethylene oxide and propylene oxide; vegetable waxes; petroleum waxes; non-ionic surfactants; silicone fluids and polysiloxanes.

Compounding

In various embodiments, the components of the thermally conductive material can be added to a batch or continuous mixer for melt blending. The components can be added in any order or by first preparing one or more masterbatches for blending with the other components. In one embodiment, a masterbatch of thermally conductive filler in one or a blend of resins can be prepared and then added to additional resin. Additives can be blended with one or more other components before being added to the bulk resins and/or filler. In one embodiment, the additives can be added directly to the compounding line without the use of previously prepared masterbatches. Typically, melt blending is conducted at a temperature above the highest melting polymer but lower than the activation temperature of peroxide (if one is present). The melt blended composition is then either delivered to an extruder or an injection molding machine or passed through a die for shaping into the desired article, or converted to pellets, tape, strip or film or some other form for storage or to prepare the material for feeding to a next shaping or processing step. Optionally, if shaped into pellets or some similar configuration, then the pellets, etc. can be coated with an anti-block agent to facilitate handling while in storage.

Compounding of the compositions can be effected by standard equipment known to those skilled in the art. Examples of compounding equipment are internal batch mixers, such as a Banbury™ or Bolling™ internal mixer. Alternatively, continuous single, or twin screw, mixers can be used, such as Farrel™ continuous mixer, a Werner and Pfleiderer™ twin screw mixer, or a Buss™ kneading continuous extruder. The type of mixer utilized, and the operating conditions of the mixer, can affect properties of the composition such as viscosity, volume resistivity, and extruded surface smoothness.

Thermally Conductive Material

The resulting thermally conductive material can have various properties making it suitable for use in one or more applications. In one or more embodiments, the thermally conductive material can require a temperature of at least 100° C., at least 110° C., or at least 120° C. for 100 μm Thermo-Mechanical Analysis ("TMA") probe penetration. TMA probe penetration is determined according to ASTM method E2347. In various embodiments, the thermally conductive material can require a temperature ranging from 100° C. to 150° C., from 110° C. to 140° C., or from 120° C. to 130° C. for 100 μm TMA probe penetration.

Articles of Manufacture

The above-described thermally conductive material can be employed as a thermal interface material in a variety of articles of manufacture. In various embodiments, the thermally conductive material can be employed in an article of manufacture comprising a heat-generating component, a heat-dissipating component, and a thermal interface material, where the thermal interface material is positioned so as to transfer heat from the heat-generating component to the heat-dissipating component, and where the thermal interface material comprises the above-described thermally conductive material. Examples of heat-generating components include, but are not limited to, microprocessors, central processing units, and graphics processors. An example of a heat-dissipating component includes, but is not limited to, a heat sink.

In other embodiments, a molded article containing the thermally conductive material can be made via an injection molding process in which the compounded material is fed to an injection molding machine to manufacture a molded part of a given design. In various embodiments, the molded part can be a heat-dissipation device, such as a heat sink.

Test Methods

Density

Density is determined according to ASTM D792.

Melt Index

Melt index, or $I_2$, is measured in accordance with ASTM D1238, condition 190° C./2.16 kg, and is reported in grams eluted per 10 minutes.

Shore Hardness

Shore hardness (A and D) is determined according to ASTM method D2240.

Thermo-Mechanical Analysis (TMA) Probe Penetration

A TA Instruments Thermomechanical Analyzer Model 2940 is used to determine the softening point of the composites. Testing is conducted according to ASTM method E2347, under a force of 1.00N. After equilibrating the instrument at 0° C., the temperature is ramped to 200° C. at 10° C. per minute. The softening point is reported as the temperature for a probe penetration of 100 μm. All measurements are conducted on 75 mil (1.9 mm) compression molded specimens.

Thermal Conductivity

Determine thermal conductivity using Hot Disk equipment (TP 2500, transient plane source) and K System (line source probe). This method conforms with ISO 22007-2: 2008. Specifically, samples having a size of 50 mm×50 mm×1 mm are used.

Some samples are aged at elevated temperatures and then analyzed for thermal conductivity. Such aging is performed by storing specimen cut from 75 mil compression-molded plaques in an oven for 2 weeks at 90° C.

Materials

The following materials are employed in the Examples, below.

A first olefin block composite ("BC 1") is an isotactic-polypropylene/ethylene-propylene olefin block composite having a density of 0.882 g/cm$^3$ and a melt index of 18.2 at 230° C.

A second olefin block composite ("BC 2") is an isotactic-polypropylene/ethylene-propylene olefin block composite having a density of 0.877 g/cm$^3$ and a melt index of 6 at 230° C.

Each of the three olefin block composites is prepared according to the following procedure. Catalyst-1 ([[rel-2', 2'''-[(1R,2R)-1,2-cylcohexanediylbis(methyleneoxy-κO)] bis[3-(9H-carbazol-9-yl)-5-methyl[1,1'-biphenyl]-2-olato-κO]](2-)]dimethyl-hafnium) and cocatalyst-1, a mixture of methyldi($C_{14-18}$ alkyl)ammonium salts of tetrakis(pentafluorophenyl)borate, prepared by reaction of a long chain trialkylamine (Armeen™ M2HT, available from Akzo-Nobel, Inc.), HCl and Li[B($C_6F_5$)$_4$], substantially as disclosed in U.S. Pat. No. 5,919,983, Ex. 2., are purchased from Boulder Scientific and used without further purification.

CSA-1 (diethylzinc or DEZ) and cocatalyst-2 (modified methylalumoxane ("MMAO")) are purchased from Akzo Nobel and used without further purification. The solvent for the polymerization reactions is a hydrocarbon mixture (ISOPAR®E) obtainable from ExxonMobil Chemical Company and purified through beds of 13-X molecular sieves prior to use.

The block composite is prepared using two continuous stirred tank reactors ("CSTR") connected in series. The first reactor is approximately 12 gallons in volume while the second reactor is approximately 26 gallons. Each reactor is hydraulically full and set to operate at steady state conditions. Monomers, solvent, hydrogen, catalyst-1, cocatalyst-1, cocatalyst-2 and CSA-1 are fed to the first reactor according to the process conditions outlined in Table 1. The first reactor contents as described in Table 1 flow to a second reactor in series. Additional monomers, solvent, hydrogen, catalyst-1, cocatalyst-1, and optionally, cocatalyst-2, are added to the second reactor.

TABLE 1

| | Block Composite Process Conditions | | | |
|---|---|---|---|---|
| | BC 1 | | BC 2 | |
| Condition | $1^{st}$ Reactor | $2^{nd}$ Reactor | $1^{st}$ Reactor | $2^{nd}$ Reactor |
| Reactor Control Temp. (° C.) | 95 | 105 | 105.0 | 116.7 |
| Solvent Feed (lb/hr) | 145 | 145 | 337.0 | 395.9 |
| Propylene Feed (lb/hr) | 11 | 30 | 43.3 | 62.7 |
| Ethylene Feed (lb/hr) | 20 | 0 | 18.0 | 0 |
| Reactor Propylene Conc. (g/L) | 2.07 | 2.23 | 2.45 | 2.63 |
| Hydrogen Feed (SCCM) | 15 | 20 | 0 | 0 |
| Catalyst Efficiency (gPoly/gM) * $10^6$ | 2.70 | 0.15 | 0.98 | 0.12 |
| Catalyst Flow (lb/hr) | 0.25 | 1.02 | 0.41 | 1.75 |
| Catalyst Conc. (ppm) | 45 | 196 | 150 | 300 |
| Cocatalyst-1 Flow (lb/hr) | 0.50 | 1.00 | 0.37 | 1.05 |
| Cocatalyst-1 Conc. (ppm) | 300 | 2000 | 1794 | 4693 |
| Cocat.-2 Flow (lb/hr) | 1.34 | 1.59 | 0.29 | 1.33 |
| Cocat.-2 Conc. (ppm) | 1494 | 19989 | 995 | 598 |
| DEZ Flow (lb/hr) | 1.60 | — | 2.50 | — |
| DEZ Concentration (ppm) | 19990 | — | 25998 | — |

TABLE 2

| Block Composite Properties | | |
|---|---|---|
| Property | BC 1 | BC 2 |
| Melt Flow Rate ("MFR") (230° C./2.16 Kg) | 18.2 | 6.0 |
| Molecular Weight (Mw) (Kg/mol) | 109 | 206 |
| Polydispersity Index (Mw/Mn) | 3.75 | 3.39 |
| Total Weight Percent $C_2$ | 33.5 | 14.0 |
| Melting Temperature (° C.) Peak 1 | 138 | 142 |
| Crystallization Temperature (° C.) | 95.3 | 103 |
| Melt Enthalpy (J/g) | 69 | 46 |
| Wt % iPP | 50 | 50 |
| Wt % EP | 50 | 50 |
| Wt % $C_2$ in EP | 65 | 30 |
| Block Composite Index | 0.441 | 0.243 |

A first olefin multiblock copolymer (OMBC 1) is a mesophase-separated ethylene/octene copolymer. The ethylene/octene multiblock copolymer is prepared according to the procedure described in detail in U.S. Pat. No. 7,947,793 for Example numbers 24-28 and 29-40. The ethylene/octene multiblock copolymer has the following properties:

Density: 0.896 g/cm³
$I_2$: 9.5 g/10 min.
$I_{10}$: 66.7 g/10 min.
$I_{10}/I_2$: 7.0
Weight-average molecular weight ("Mw") (in g/mol): 69,750
Number-average molecular weight ("Mn") (in g/mol): 32,850
Polydispersity index ("Mw/Mn"): 2.1
Heat of fusion (in J/g): 128.7
Melting temperature ("$T_m$"): 119.6
Crystallization temperature ("$T_c$"): 104.3
Overall octene content (in mol %): 10.6
Octene content in Soft Segment (in mol %): 29.3
Octene content in Hard Segment (in mol %): 1.6
ΔOctene: 27.7

A second olefin multiblock copolymer (OMBC 2) is a mesophase-separated ethylene/octene copolymer. The ethylene/octene multiblock copolymer is prepared according to the procedure described in detail in U.S. Pat. No. 7,947,793 for Example numbers 24-28 and 29-40. The ethylene/octene multiblock copolymer has the following properties:

Density: 0.887 g/cm³
$I_2$: 10.5 g/10 min.
$I_{10}$: 77.5 g/10 min.
$I_{10}/I_2$: 7.4
Weight-average molecular weight ("Mw") (in g/mol): 70,740
Number-average molecular weight ("Mn") (in g/mol): 32,800
Polydispersity index ("Mw/Mn"): 2.2
Heat of fusion (in J/g): 72.7
Melting temperature ("$T_m$"): 119.8
Crystallization temperature ("$T_c$"): 104.5
Overall octene content (in mol %): 13.1
Octene content in Soft Segment (in mol %): 26.1
Octene content in Hard Segment (in mol %): 1.4
ΔOctene: 24.7

ENGAGE™ 8200 is an ethylene/octene polyolefin elastomer having a melt index of 5.0 g/10 min. and a density of 0.870 g/cm³. ENGAGE™ 8200 is commercially available from The Dow Chemical Company, Midland, Mich., USA.

KRATON™ A1536H is a linear triblock copolymer based on styrene and ethylene/butylene ("SEBS") having a typical polystyrene content of 42 wt %, a Shore A hardness of 65, and a melt index (260° C., 5 kg) of 7 g/10 min. KRATON™ A1536H is commercially available from Kraton Performance Polymers, Inc., Houston, Tex., USA.

KRATON™ G1701E is a linear diblock copolymer based on styrene and ethylene/propylene ("S-E/P") with bound styrene of 35% mass and a specific gravity of 0.91.

The expanded graphite is TIMREX™ C-Therm 011, commercially available from Timcal Graphite and Carbon, was used as received. It is described as soft granule type with high aspect ratio and having an ash content <0.3%, which reportedly has a high effect on imparting thermal conductivity when added to polymeric resins.

The boron nitride is MK-hBN-N70, with a 70-nm average particle size and a density of 2.29 g/cm³. The boron nitride is commercially available from Lower Friction, a Division of M.K. IMPEX CANADA, Mississauga, Ontario, Canada.

Dicumyl peroxide ("DCP") is commercially available from Sigma Aldrich.

EXAMPLES

Example 1—Thermal Conductivity of Base Polymers

Measure the thermal conductivity of ENGAGE™ 8200, OMBC 1, and BC 1 according to the procedure described in the Test Methods section, above. The results are provided in Table 3, below.

TABLE 3

Thermal Conductivity of Base Polymers

| Base Resin | Thermal Conductivity (unaged) @ 25° C. (W/m · K) |
|---|---|
| ENGAGE ™ 8200 | 0.27 |
| OMBC 1 | 0.29 |
| BC 1 | 0.24 |

Example 2—Comparison of Block Composite to Crosslinked Polyolefin Elastomer

Prepare two Comparative Samples (CS1 and CS2) and two Samples (S1 and S2) according to the formulations provided below in Table 5. Compounding of all samples is conducted in a 250-cc Brabender batch mixer, set at 45 rpm rotor speed. In preparing the compounds, the polymer resins are first loaded, and then the thermal fillers are slowly loaded until all added. This is done to ensure adequate incorporation of the filler into the polymer melt. Once all components are added, the mixer is run for a mixing period as shown in Table 4. For compositions containing peroxide, following the primary mixing period common to all samples, the mixer is slowed down and run at a reduced speed of 5 rpm to allow the compound to cool to about 125° C. to enable peroxide addition without triggering decomposition of the peroxide. Once the peroxide is added, it is mixed for an additional 5 minutes at 10 rpm, while observing to ensure that this addition step occurs at a temperature not exceeding 125° C. The compounding conditions for all samples are given in Table 4.

Analyze CS1, CS2, S1, and S2 according to the Test Methods described above. Results of the analyses are provided in Table 6, below.

TABLE 6

Properties of CS1, CS2, S1, and S2

| Property | CS1 | CS2 | S1 | S2 |
|---|---|---|---|---|
| Thermal Conductivity (unaged) @ 25° C. (W/m · K) | 0.93 | 4.36 | 0.70 | 4.47 |
| Standard Deviation | 1.52E-04 | 7.42E-04 | 3.04E-04 | 1.85E-03 |
| Thermal Conductivity (aged 30 days @ 90° C.) @ 25° C. (W/m · K) | 0.92 | 4.26 | 0.73 | 4.10 |
| Standard Deviation | 8.79E-05 | 8.01E-04 | 5.57E-04 | 8.86E-03 |
| Temperature for 100 μm TMA Probe Penetration (° C.) | 50.7 | 64.5 | 120.5 | 127.5 |

Samples S1 and S2 show similar results in terms of thermal conductivities compared to CS1 and CS2 for equivalent expanded graphite loadings. It should be noted that the S1 and S2 compositions do not contain peroxide and are not crosslinked. Thermo Mechanical Analysis (TMA) testing for S1 and S2 show a probe penetration of 100 microns occurring at a temperature of 120.5° C. and 127.5° C. respectively, which indicates superior thermal resistance compared to CS1 and CS2, despite the fact that they are not crosslinked, thus establishing these compounds as suitable for higher-temperature applications.

Example 3—Comparison of Block Composite to Polyolefin Elastomer and Olefin Multiblock Copolymer Prepare two Comparative Samples (CS3 and CS4) and one Sample (S3) according to the formulations provided below in Table 7. CS3, CS4, and S3 are prepared using the compounding procedure described in Example 2 using the compounding conditions provided in Table 4.

TABLE 4

Brabender Compounding Conditions

| | CS1 | CS2 | S1 | S2 | CS3 | CS4 | S3 | CS5 | CS6 | CS7 | CS8 | S4 |
|---|---|---|---|---|---|---|---|---|---|---|---|---|
| Mixer Set Temp. (° C.) | 125 | 125 | 125 | 125 | 125 | 125 | 125 | 150 | 150 | 170 | 220 | 180 |
| Rotor Speed | 45 | 45 | 45 | 45 | 45 | 45 | 45 | 45 | 45 | 45 | 45 | 45 |
| Mixing period (min.) | 15 | 15 | 15 | 15 | 25 | 25 | 25 | 25 | 25 | 25 | 25 | 25 |

TABLE 5

Compositions of CS1, CS2, S1, and S2

| Component | CS1 | CS2 | S1 | S2 |
|---|---|---|---|---|
| ENGAGE ™ 8200 (wt %) | 90 | 60 | — | — |
| BC 1 (wt %) | — | — | 90 | 60 |
| C-Therm 011 (wt %) | 10 | 40 | 10 | 40 |
| Total: | 100 | 100 | 100 | 100 |
| DCP (wt %) | 2 | 2 | — | — |

TABLE 7

Compositions of CS3, CS4, and S3

| Component | CS3 | CS4 | S3 |
|---|---|---|---|
| ENGAGE ™ 8200 (wt %) | 60 | — | — |
| OMBC 1 (wt %) | — | 60 | — |
| BC 1 (wt %) | — | — | 60 |
| C-Therm 101 (wt %) | 40 | 40 | 40 |
| Total | 100 | 100 | 100 |

Analyze CS3, CS4, and S3 according to the Test Methods described above. Results of the analyses are provided in Table 8, below.

TABLE 8

Properties of CS3, CS4, and S3

| Property | CS3 | CS4 | S3 |
|---|---|---|---|
| Shore A Hardness | 95.0 | 96.2 | 97.6 |
| Shore D Hardness | 42.9 | 51.1 | 53.5 |
| Temperature for 100 μm TMA Probe Penetration (° C.) | 62.8 | 117.5 | 128.5 |
| Thermal Conductivity (unaged) @ 25° C. (W/m · K) | 4.71 | 4.30 | 5.09 |
| TC Standard Deviation | 1.9E-03 | 2.7E-03 | 1.2E-03 |

Comparing non-crosslinked systems, CS3 and CS4 use respectively a random olefin copolymer elastomer and a phase-separated olefin multiblock copolymer, each containing 40 wt % of expanded synthetic graphite and exhibiting thermal conductivity values of 4.71 and 4.30 W/m·K respectively. TMA testing for CS3 and CS4 shows a probe penetration of 100 microns occurring at 62.8° C. for CS3 and 117.5° C. for CS4. S3, by comparison, shows a higher thermal conductivity of 5.09 W/m·K and a higher probe penetration temperature of 128.5° C.

Example 4—Comparison of Block Composite to Polyolefin Elastomer, Olefin Multiblock Copolymer, and Styrenic Block Copolymers Prepare four Comparative Samples (CS5-CS8) and one Sample (S4) according to the formulations provided below in Table 9. CS5-CS8 and S4 are prepared using the compounding procedure described in Example 2 using the compounding conditions provided in Table 4.

TABLE 9

Compositions of CS5-CS8 and S4

| Component | CS5 | CS6 | CS7 | CS8 | S4 |
|---|---|---|---|---|---|
| ENGAGE ™ 8200 (wt %) | 65 | — | — | — | — |
| OMBC 2 (wt %) | — | 65 | — | — | — |
| SEBS (wt %) | — | — | 65 | — | — |
| S-E/P (wt %) | — | — | — | 65 | — |
| BC 2 (wt %) | — | — | — | — | 65 |
| Boron Nitride (wt %) | 35 | 35 | 35 | 35 | 35 |
| Total | 100 | 100 | 100 | 100 | 100 |

Analyze CS5-CS8 and S4 according to the Test Methods described above. Results of the analyses are provided in Table 10, below.

TABLE 10

Properties of CS5-CS8 and S4

| Property | CS5 | CS6 | CS7 | CS8 | S4 |
|---|---|---|---|---|---|
| Shore A Hardness | 87.4 | 96.7 | 88.2 | 86.2 | 99.6 |
| Temperature for 100 μm TMA Probe Penetration (° C.) | 45 | 84.5 | 92.6 | 73.3 | 100 |
| Thermal Conductivity (unaged) @ 25° C. (W/m · K) | 0.56 | 0.60 | 0.43 | 0.39 | 0.44 |
| TC Standard Deviation | 5.10E-04 | 5.31E-04 | 2.16E-04 | 1.27E-04 | 7.98E-05 |

As seen in the results provided in Table 10, Sample S4 shows a higher or equivalent thermal conductivity of 0.44 W/m-K and a higher probe penetration temperature of 100° C. compared to the styrenic block copolymers tested (CS7 and CS8). Also S4, despite having a lower density, exhibits a temperature resistance advantage over the polyolefin elastomer (CS5) and the olefin multiblock copolymer (CS6), as evidenced by its higher TMA probe penetration value.

The invention claimed is:

1. A thermally conductive material, consisting of:
   (a) from 60 wt % to 90 wt % of an olefin block composite comprising (1) a soft copolymer, (2) a hard copolymer, and (3) a block copolymer having a soft segment and a hard segment, wherein the soft segment of the block copolymer is the same composition as the soft copolymer and the hard segment of the block copolymer is the same composition as the hard copolymer;
   (b) from 10 wt % to 40 wt % of a thermally conductive filler selected from the group consisting of aluminum oxide ($Al_2O_3$), magnesium oxide (MgO), boron nitride (BN), zinc oxide (ZnO), silicon carbide (SiC), aluminum nitride (AlN), graphite, expanded graphite, multi-walled carbon nanotubes, carbon fiber, pyrolytic graphite sheets, silver, aluminum, copper, and mixtures of two or more thereof;
   (c) optionally a plasticizer;
   (d) optionally a curing agent; and
   (e) optionally one or more additives selected from the group consisting of antioxidants, cross linking co-agents, cure boosters, scorch retardants, processing aids, coupling agents, ultraviolet stabilizers, antistatic agents, nucleating agents, slip agents, lubricants, viscosity control agents, tackifiers, anti-blocking agents, surfactants, extender oils, acid scavengers, flame retardants, adhesion promoters, metal deactivators, and combinations thereof,
   wherein said thermally conductive filler is present in an amount sufficient to provide said thermally conductive material with a higher thermal conductivity relative to said olefin block composite in its neat state, and the weight percent is based on the combined weight of the olefin block composite and the thermally conductive filler.

2. The thermally conductive material of claim 1, wherein said olefin block composite comprises block copolymers having hard polypropylene segments and soft ethylene-propylene segments.

3. The thermally conductive material of either claim 1, wherein said olefin block composite has a density of at least 0.880 g/cm³.

4. The thermally conductive material of claim 1, wherein the thermal conductivity of said thermally conductive material is at least 10 percent greater than the thermal conductivity of said olefin block composite in its neat state.

5. The thermally conductive material of claim 1, wherein said thermally conductive material requires a temperature of at least 100° C. for 100 μm TMA probe penetration according to ASTM E2347.

6. The thermally conductive material of claim 1, wherein said thermally conductive material requires a temperature from 120° C. to 130° C. for 100 μm TMA probe penetration according to ASTM E2347.

7. The thermally conductive material of claim 1, comprising one or more additives selected from the group consisting of plasticizers, curing agents, processing aids, tackifiers, antioxidants, ultraviolet stabilizers, flame retardants, and adhesion promoters.

8. The thermally conductive material of claim 1, wherein the thermally conductive filler is present in an amount of greater than 30 wt % to 40%, based on the total combined weight of the olefin block composite and the thermally conductive filler.

9. The thermally conductive material of claim 1, consisting of (a) the olefin block composite and (b) the thermally conductive filler.

10. The thermally conductive material of claim 9 wherein said thermally conductive material requires a temperature from 120° C. to 130° C. for 100 μm TMA probe penetration according to ASTM E2347.

11. An article of manufacture, comprising:
(a) a heat-generating component;
(b) a heat-dissipating component; and
(c) a thermal interface material,
wherein said thermal interface material is positioned so as to transfer heat from said heat-generating component to said heat-dissipating component,
wherein said thermal interface material comprises at least a portion of said thermally conductive material of claim 1.

12. An article of manufacture, comprising a molded heat-dissipation device, wherein said molded heat-dissipation device comprises at least a portion of said thermally conductive material of claim 1.

* * * * *